Figure 4:
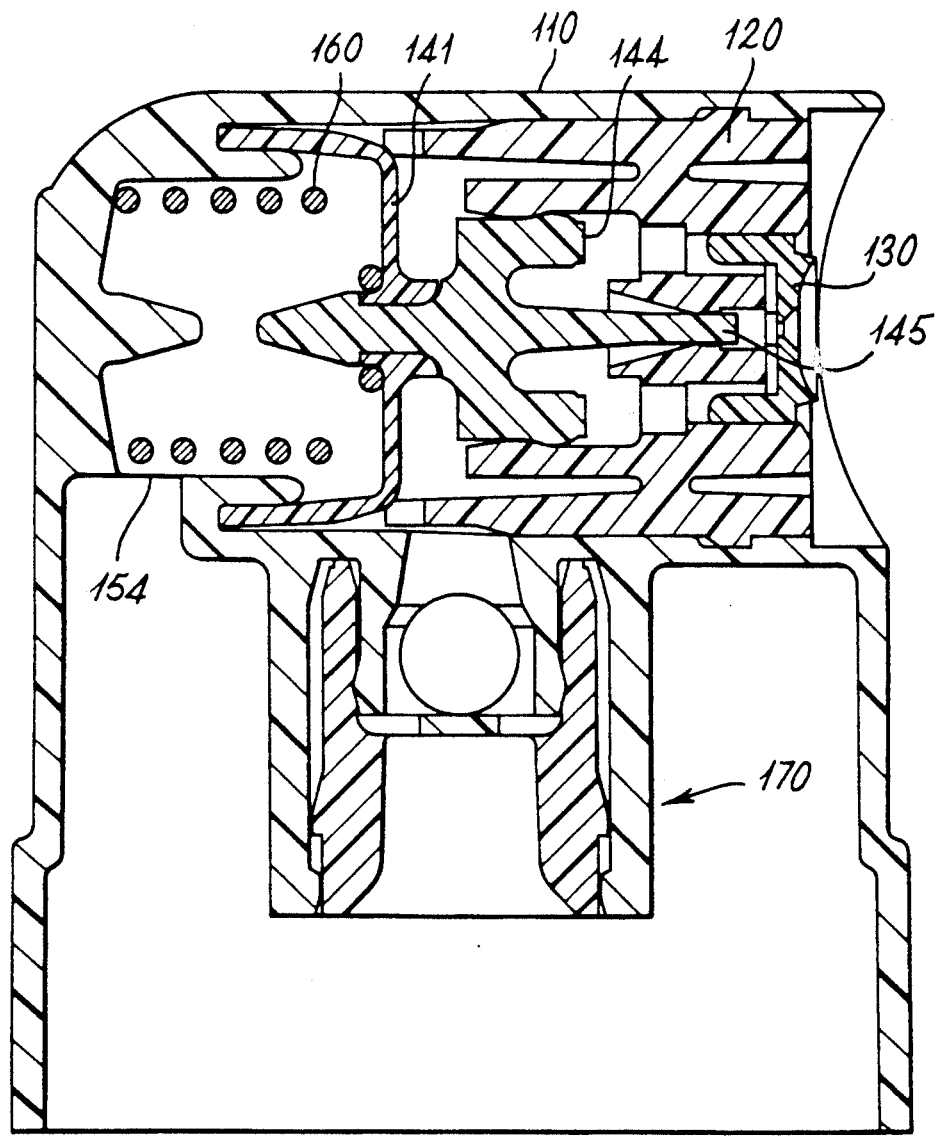

United States Patent [19]

Warren

[11] Patent Number: 5,042,697
[45] Date of Patent: Aug. 27, 1991

[54] PRESSURE REGULATORS

[75] Inventor: William E. Warren, Potters Bar, England

[73] Assignee: National Research Development Corporation, London, England

[21] Appl. No.: 411,530

[22] PCT Filed: Mar. 7, 1989

[86] PCT No.: PCT/GB89/00225

§ 371 Date: Oct. 2, 1989

§ 102(e) Date: Oct. 2, 1989

[87] PCT Pub. No.: WO89/08879

PCT Pub. Date: Sep. 21, 1989

[30] Foreign Application Priority Data

Mar. 8, 1988 [GB] United Kingdom ............... 8805523
Feb. 1, 1989 [GB] United Kingdom ............... 8902142

[51] Int. Cl.$^5$ ............................................. B65D 83/00
[52] U.S. Cl. ................................ 222/402.1; 222/501; 239/117; 137/505.13
[58] Field of Search .............. 222/402.1, 148–151, 222/501; 239/114–117; 137/505.13, 505.25

[56] References Cited

U.S. PATENT DOCUMENTS

| | | | |
|---|---|---|---|
| 2,825,602 | 3/1958 | Rabbitt | 239/117 |
| 3,250,474 | 5/1966 | McKernan | 239/117 |
| 3,584,789 | 6/1971 | Traynor | 239/117 |
| 3,730,215 | 4/1971 | Conery et al. | |
| 3,930,519 | 1/1976 | Byrd | 137/505.25 |
| 4,124,149 | 11/1978 | Spitzer | |
| 4,281,779 | 8/1981 | Shepard | 222/501 |
| 4,487,334 | 12/1984 | Werding | |
| 4,519,528 | 5/1985 | Comment | |
| 4,754,897 | 7/1988 | Brace | |
| 4,785,977 | 11/1988 | Ball | 137/505.13 X |

FOREIGN PATENT DOCUMENTS

| | | |
|---|---|---|
| 0057226 | 8/1981 | European Pat. Off. |
| 0109361 | 11/1983 | European Pat. Off. |
| 0133770 | 7/1984 | European Pat. Off. |
| 0183425 | 11/1985 | European Pat. Off. |
| 0251438 | 1/1988 | European Pat. Off. |
| 73545 | 8/1960 | France |
| 2306388 | 10/1976 | France |
| 70569 | 6/1942 | U.S.S.R. |
| 1437838 | 1/1987 | U.S.S.R. |
| 367284 | 7/1930 | United Kingdom |
| 517132 | 7/1938 | United Kingdom |
| 563208 | 10/1942 | United Kingdom |
| 698925 | 12/1951 | United Kingdom |
| 1175045 | 3/1966 | United Kingdom |
| 2078341 | 6/1980 | United Kingdom |
| 2216634 | 7/1989 | United Kingdom |
| 01930 | 5/1984 | World Int. Prop. O. |
| 86/04163 | 7/1986 | World Int. Prop. O. |
| 04163 | 7/1986 | World Int. Prop. O. |

*Primary Examiner*—Michael S. Huppert
*Assistant Examiner*—Gregory L. Huson
*Attorney, Agent, or Firm*—Cushman, Darby & Cushman

[57] ABSTRACT

A pressure regulator suitable for an aerosol dispenser package having a compressed non-liquified gas propellant comprising a chamber (22) forming a successive pair of first and second compartments (23,24) with the first compartment (23) having an inlet opening (26,27) and the second compartment (24) partly defining a restricted passageway (47) leading to an outlet opening (25), a diaphragm (41) closing the first compartment remotely from the second compartment, a spring (60) operable to urge the diaphragm to move into the second compartment towards the outlet, and a piston (44) connected for movement with the diaphragm and located in the second compartment to define the restricted passageway, the second compartment and piston cooperating progressively to increase the effective size of the passageway as the diaphragm moves towards the outlet. Preferably a probe (45) is moved with or by the piston to close the chamber outlet when the diaphragm is subject only to action by the spring. Preferably also the regulator has an associated valve (70) with a chamber (71) having a convergently tapered outlet (74) communicated with the regulator inlet, a ball (77) captively housed in the valve chamber for movement into substantially sealed engagement in tapered opening, and the valve chamber being formed by a pair of parts (72,73) connected for mutual telescopic sealed sliding movement about the ball.

15 Claims, 3 Drawing Sheets

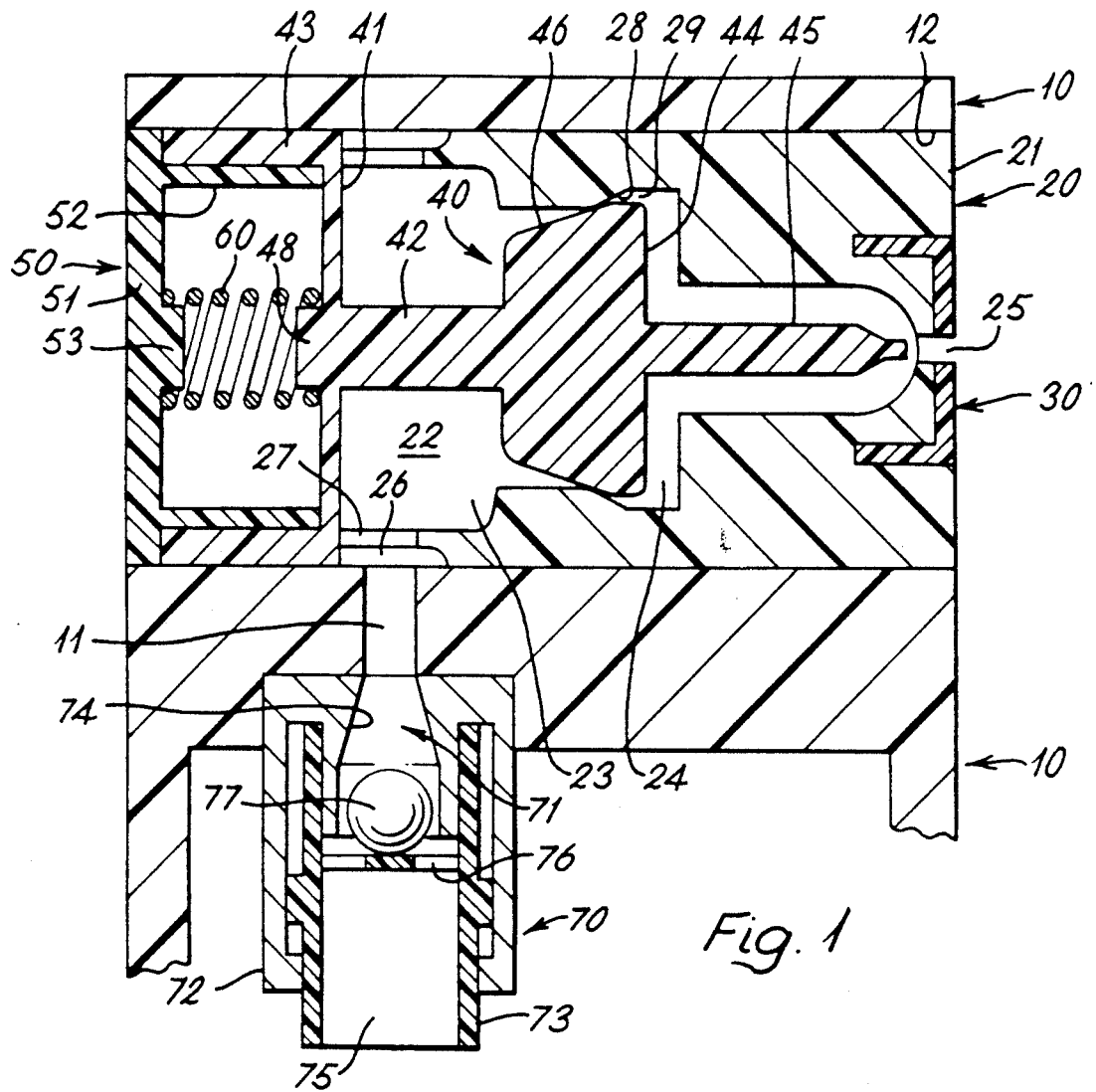
Fig. 1
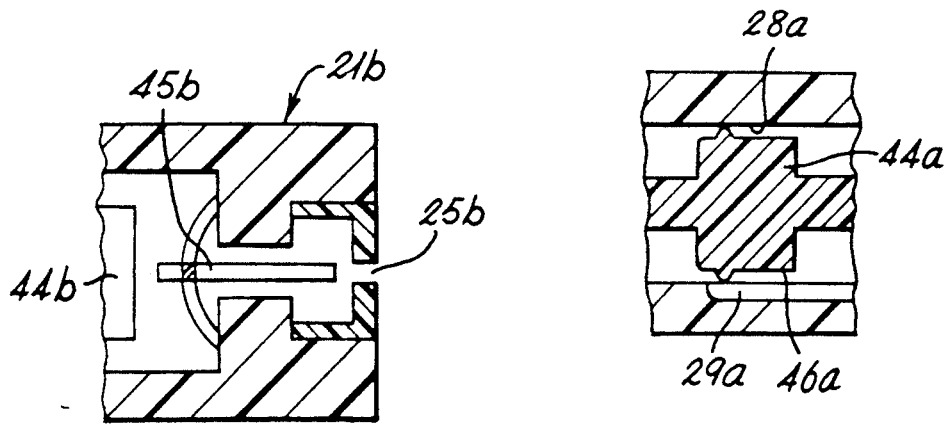
Fig. 3
Fig. 2

PRESSURE REGULATORS

There is now a well-established wish for aerosol dispenser packages which use compressed rather than liquified gas propellants. A fundamental need in satisfying this wish is the provision of a regulator whereby the product to be dispensed is propelled from the package at a generally constant flow rate. In the absence of such regulation the dispensed flow rate will initially be too great and progressively reduce with the propellant pressure as the package empties. This is not compatible with the maintenance of a generally consistent spray and other discharge characteristics which are required for most products.

Various forms of regulators have been proposed whereby, as the gas pressure reduces, the product metering orifice is effectively progressively increased in size in order to maintain the flow rate. However, none of these proposals has proved practicable in large scale manufacture.

An object of the present invention is to provide an improved such form of regulator and, to this end, there is provided a pressure regulator comprising: a chamber forming a successive pair of compartments at respectively opposite ends thereof, one of said compartments partly defining a restricted elongate passageway leading to an outlet opening from said chamber, and the other of said compartments having an inlet opening into said chamber; a diaphragm closing said other compartment remotely from said one compartment; a spring operable to urge said diaphragm to move into said other compartment towards said outlet opening; and a piston connected with said diaphragm for movement therewith and located in said one compartment to define therewith said passageway, said one compartment and piston cooperating progressively to increase the effective size of said passageway as said diaphragm moves towards said outlet opening.

In use of the present regulator pressurised product enters the chamber by way of the inlet opening and other compartment in a relatively unrestricted manner and so acts on the inner face of the diaphragm and the opposed inner face of the piston without any pressure reduction of significance. Product leaves the chamber by way of the one compartment and outlet opening and so additionally acts on the outer face of the piston, but at a pressure dependent on the action of the restricted passageway through the one compartment. At the same time, the spring acts on the outer face of the diaphragm.

Generally speaking the sum of these actions is that of a balanced piston assembly because the diaphragm can be equated with a further piston of predetermined diameter. The use of a diphragm rather than a further piston is, however, beneficial in facilitating closure of the chamber without the need for O-rings or equivalent sliding seal members.

Ideally the diaphragm equates with a piston diameter which equals that effective for the inner face of the first-mentioned piston. In these circumstances the spring force will act to move the first piston until the effective size of the restricted passageway produces a pressure which acts on the outer face of the piston to balance such force. In the result the regulator operates to control the product output pressure in dependence upon the spring force and this force can be maintained substantially constant.

In practice the provision of a diaphragm which equates with a piston diameter which is sufficiently constant over a range of operating pressures, and resultant diaphragm deflections, may not be a straightforward matter. Accordingly the diaphragm suitably approximates the relevant diameter.

It will be appreciated that the spring is located outside the chamber effectively to act on the outer face of the diaphragm and also that this last-mentioned face is not to be subjected directly to product pressure. For these purposes the spring is preferably sited in a tubular member having one longitudinal end open, and the diaphragm is formed across one end of a sleeve of similar tubular form for sealed mounting over the member one end, pressure within the chamber other compartment acting on the sleeve to aid its sealing on the member one end, with the spring acting centrally of the diaphragm.

Various forms can be used for the one compartment and piston whereby these elements cooperate in the requisite manner.

The present preference is for these elements to have respective mutually facing annular surfaces between which the restricted passageway is defined, these surfaces each being similarly inclined relative to the direction of regulator movement and separating in progressively increasing manner from near-sealing engagement as the piston moves towards the outlet opening. The annular surfaces in question are themselves suitably mutually inclined at a small angle, such as 3°-5°, to extend divergently towards the outlet opening.

In an alternative form the piston is in a near-sealing relationship within a portion of the one compartment, such portion being of cylindrical form and having a keyway of which a closed end section is progressively increasingly exposed to the first compartment as the piston moves towards the outlet opening.

In this last context a near-sealing relationship is to be understood as one in which fluid flow past the piston occurs predominantly by way of the keyway, but without the piston contacting the adjacent compartment to give rise to friction.

Preferably, in application to an aerosol dispensing package, the proposed regulator is located downstream of an operating valve relative to the product in the package, which valve is operable to open and shut the package interior for the purposes of product release or not. In this event the regulator is preferably of a form in which the piston cooperates with a probe to close the outlet opening when the operating valve is shut. The probe for this purpose can be connected with the piston for movement therewith. Alternatively a separate sprung probe can be used, the spring action of such probe being normally effective to open the orifice, and the probe being operable against its spring bias to close the outlet opening by piston movement to engage the probe.

Also, when the proposed regulator is located downstream of an associated operating valve, an additional valve is preferably connected between the operating valve and its operating button or other actuator to reduce the loss of propellant which may otherwise occur with operation of the package when tilted substantially from an upright disposition.

Such an additional valve comprises a chamber having inlet and outlet openings, and a ball housed in the chamber for movement towards and away from the outlet opening, the outlet opening being outwardly convergently tapered for substantial sealing engagement of the ball therein, and the chamber being defined by two parts sealably slidably interconnected for limited mutual telescoping movement.

In the presently proposed use, the inlet and outlet openings of the additional valve are respectively communicated with the operating valve outlet and the regulator inlet. If the package is rotated substantially from an upright disposition, actuation of the operating valve does not cause dispensing because the propellant pressure and modified gravitational action on the ball are such as to move the ball into sealed engagement in the tapered geometry of the opening. Any tendency for the ball to stick in the tapered opening is alleviated by the fact that actuation of the operating valve will act to compact telescopically the chamber of the additional valve and, correspondingly, when the operating valve is released, propellant pressure in the chamber is relieved by causing telescopic expansion. If necessary, further pressure reduction and, possibly, back-flow may be caused by manually lifting the operating button to the extreme of its limits. The ball can then fall from the tapered opening on returning the package towards an upright disposition, or such ball movement can be caused by shaking the dispenser.

Figure 5:
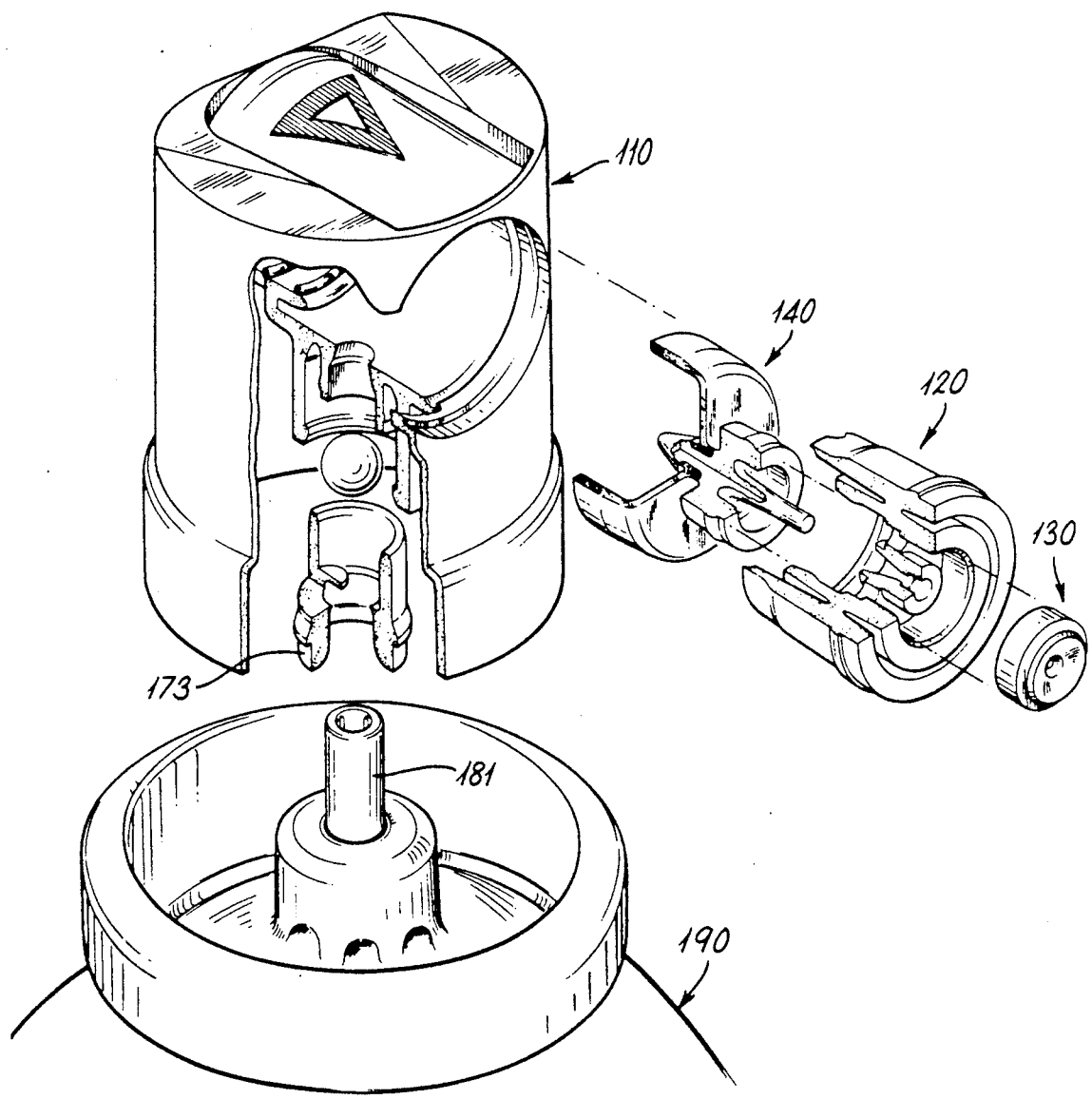

Examples of the above forms of the invention are described below, whereby these and other forms can be better understood and appreciated, with reference to the accompanying drawings, in which:

FIG. 1 schematically illustrates one form of a regulator according to the invention, which regulator is provided with an outlet closure probe and a tilt protection valve, FIG. 2 similarly illustrates a modification of the regulator of FIG. 1, FIG. 3 illustrates in similar manner an alternative form of probe from that of FIG. 1, and FIGS. 4 and 5 illustrate one embodiment of the form of FIG. 1 respectively in cross-sectional view when assembled and partially sectioned exploded view.

FIG. 1 shows the upper portion of an operating button 10 for an aerosol dispenser package. This button is suitably operable by depression relative to the package to open a normally-closed valve communicated by way of a dip tube with a fluent product packed in a can or other vessel under gas pressure. Detail of the valve, dip tube, can, product and gas is not necessary to an understanding of the regulator of FIG. 1 and its operation, except to note that the gas pressure will reduce as described in the introductory passage above and that, in use, product to be dispensed is applied under gas pressure to the regulator by way of passageway 11 in the button.

The regulator of FIG. 1 is denoted generally at 20 and is housed in a transverse diametral bore 12 in the button.

The regulator has a main body 21 fitted in the bore 12 to extend partway therethrough from one end. This body is axially hollowed from its other end to define a chamber 22 formed by first and second compartments 23 and 24 leading successively to an outlet opening 25 formed by the orifice of a spray nozzle 30 at the one end of the body. At its other end the radially outer surface of the body is circumferentially relieved to form an annular channel 26 between itself and the button, this channel communicates with the passageway 11, and the body at the floor of the channel is formed with apertures 27 at intervals therearound additionally to communicate the channel with the first compartment of the chamber.

A regulator control member 40 is located in the chamber. This member comprises a diaphragm 41 disposed transversely across the first compartment, the diaphragm having a piston rod 42 projecting from its centre towards the second compartment and a tubular flange 43 projecting from its periphery in the opposite direction. At its end remote from the diaphragm, the piston rod carries a piston 44 sited in the second compartment and, from the piston centre, a probe 45 projects towards the outlet opening. The piston and a longitudinal portion of the second compartment are formed with respective mutually facing annular surfaces 46 and 28 which are similarly inclined in divergent manner towards the outlet opening. Preferably these surfaces are mutually inclined at a small angle of 3°–5° in divergent manner towards the outlet and define therebetween a restricted passageway 29 of variable size dependent on the position of the piston in the second compartment.

The control member is held in position by a closure member 50 for the chamber. This closure member is of capped plug form having an end part 51 to close the chamber and ʳ tubular part 52 extending within the body to serve as a mount for the diaphragm flange 43.

A compression spring 60 is located to act between the closure member end part and the control member diaphragm, the end part and diaphragm being suitably formed with respective projections 53 and 48 to seat the ends of the spring.

Operation of this regulator is essentially as described above. Depression of the button 10 opens the associated valve to allow flow of product from within the can, under gas pressure, into passageway 11, into the annular channel 26 and through the apertures 27 into the chamber 22 where regulation occurs.

It will be noted that release of the button closes the associated valve and supply of pressurised product to the chamber 22 ceases. In these circumstances the control member 40 is urged by the spring 60 to close the outlet opening by engagement of the probe 45 with the latter. This is beneficial in maintaining the opening free of blockage by dried product.

Lastly in FIG. 1, an inclination protection valve is associated with the regulator and denoted generally at 70.

The valve 70 includes a chamber 71 formed by two parts 72, 73 each of generally tubular form and interconnected for sealed limited mutual telescoping movement. Part 72 is connected with the button 10 and defines for the chamber 71 a convergently tapered outlet opening 74 communicated with passageway 11 of the button. Part 73 will be connected with the operating valve and defines an inlet opening 75 for the chamber which will be communicated with the outlet of such valve. Part 73 also includes an apertured transverse member 76 located across its interior to render captive, within the chamber, a ball 77 of diameter greater than the minimum for tapered outlet opening 75.

In use of the relevant dispenser, actuation of the button will open the operating valve and, at the same time, telescopically compact the parts 72 and 73. If, in this situation, the package is sufficiently rotated from an upright disposition as to render dispensing action undesirable because of a consequent loss of propellant, the ball will move to close the protection valve as described earlier above. Thereafter, when the ineffective operation is appreciated and the button released, the operating valve is closed and the propellant pressure otherwise retained between this last valve and the ball is reduced by action of this pressure to telescopically expand the parts 72 and 73. This pressure reduction facilitates release of the ball from the tapered opening, again, as described above.

In the modification of FIG. 2 the piston peripheral surface 46a is close to a sealing relationship with a cylindrical surface portion 28a in the second compartment except for a keyway 29a formed axially in such surface portion. This keyway forms a restricted passageway of progressively increasing effective size as the piston moves towards the outlet opening to expose more of the closed end portion of the keyway to the first compartment.

In the modification of FIG. 3 an alternative form of probe 45b is shown. In this alternative the probe is of sprung form mounted directly within the regulator body 21b rather than on an associated piston. The spring action of the probe is such that the adjacent outlet opening 25b is normally open, but the opening is closed by piston movement to engage the probe and urge the latter against its spring bias towards the opening.

In the embodiment of FIGS. 4 and 5 the parts are designated by the same reference numerals as those of FIG. 1 for corresponding ports, but with the addition of a one hundred digit for purposes of distinction. Much of the nature of this embodiment and its operation accords with the preceding description of FIG. 1, but some distinctive features of practical significance arise and it is useful to note these.

A group of such features involve manufacture of parts for push-fit and snap-fit interconnection to facilitate assembly. For example, the tubular part 152 is formed with the button 110 and receives the diaphragm flange 143 in a sealing push-fit. The diaphragm is, in turn, formed separately from the piston 144 and these parts are connected by snap-fit of the piston rod through the diaphragm centre. Also the piston engages in the body part 120 by snapping the inclined annular surface of the former past the relatively inclined similar surface of the latter. Again, the body part is engaged in the button with a rib-and-groove snap-fit formation, while the spray nozzle is a push-fit in the body 120. Lastly, the tilt protection valve sliding part 173 is connected with its related part 172 by way of a snap-fit.

The two-part construction of the control member 130 from piston and diaphragm parts represents another feature of significance. This construction facilitates the provision of the quite different physical properties appropriate to the constituent parts by allowing the use of correspondingly different materials.

Another feature involves the provision of a vent 154 to atmosphere from the space behind the diaphragm to avoid variation of pressure in this space in association with diaphragm movement.

Also, it is to be noted, as seen from FIG. 5, that the sliding part 173 is formed for direct engagement with the tubular outlet opening 181, or so-called stem, of the operating valve projecting from the can 190 of the package partially shown in this figure. The operating valve can, of course, be of any suitable form and, to the extent that there are a variety of well-established commercially-available operating valves with differing sizes of stem, it may be appropriate to make the proposed regulator with a corresponding variation of sliding parts 173. Alternatively, the sliding part 173 may be standardised for use with varying adaptors for connection with dfferent operating valve stems.

While the invention has been described with more particular reference to the illustrated forms and embodiment, further modification and variation is possible within the invention as presented more broadly in the preceding introductory passages.

It is also appropriate to note that some features of the invention as described above are not necessarily related to the proposed regulator. This is true of both the probe and inclination protection valve. The probe is equally applicable, for example, to other regulators similar to that above in comprising a control element reciprocable within and along a fluid path to regulate the same in response to propellant pressure variations and a bias spring, with the spring urging the element towards an outlet orifice for the path. The protection valve is similarly applicable to other regulators and indeed other aerosol dispenser package situations where propellant loss by operation in inclined attitudes is to be avoided.

Lastly, while the proposed regulator has been conceived and developed to date for application to aerosol dispenser package, other applications are possible in relation to similar regulation requirements in different contexts.

I claim:

1. A pressure regulator comprising:
   a chamber forming a successive pair of compartments at respectively opposite ends thereof, one of said compartments partly defining a restricted passageway leading to an outlet opening from said chamber, and the other of said compartments having an inlet opening into said chamber;
   a diaphragm located across one end of said chamber to close said other compartment, said one end being remote from said one compartment;
   a spring operable to urge said diaphragm to move into said other compartment towards said outlet opening; and
   a piston connected with said diaphragm for movement therewith and located in said one compartment to define therewith said passageway, said one compartment and piston cooperating progressively to increase the effective size of said passageway as said diaphragm moves towards said outlet opening, said diaphragm having a suspended part and the suspended part having a larger surface area than the mutually facing surface of the piston so that the respective forces acting on the diaphragm-to-piston connection due to an input pressure acting on the surfaces in said other compartment are substantially equal and opposite, whereby the resultant output pressure in said one chamber which acts on the piston surface remote from the diaphragm is determined essentially by the spring-force acting through the diaphragm and its piston connection.

2. A regulator according to claim 1 wherein said spring is sited in a tubular member having one longitudinal end open, and said diaphragm is formed with a peripheral flange of similar tubular shape to said member one end and sealably mounted over such end, with said spring acting centrally of said diaphragm.

3. A regulator according to any one of claim 1 wherein said piston moves in near-sealingly engaged relationship within an annular surface of cylindrical form in said one compartment, except for a keyway in said annular surface having a closed end portion progressively increasingly exposed to said other compartment as said piston moves towards said outlet opening.

4. A regulator according to claim 1 assembled in a housing providing a socket of generally cylindrical hollow form open at one end, said tubular member being connected in said housing to project partway along said socket from the other end thereof, said diaphragm having a central bore axially directed along said socket, said piston having a piston rod projecting therefrom and connected in snap-fit manner in said diaphragm bore, and said pair of compartments being defined relative to said diaphragm and piston by a plug of generally tubular form engaged in said socket in snap-fit manner from said open end, and said piston being engaged by snap-fit passage of an inclined annular surface thereon through a related such surface within the other end of said plug to define said restricted passageway.

5. A regulator according to claim 1 in combination with a valve comprising a chamber having inlet and outlet openings, and a ball captively housed in said valve chamber for movement towards and away from its outlet opening, said valve outlet opening being serially communicable with said regulator inlet opening and being outwardly convergently tapered for substantial sealing engagement of said ball therein, and said valve chamber being defined by two parts sealably slidably interconnected for limited mutual telescoping movement.

6. A regulator according to claim 1 in combination with an open/shut operating valve for an aerosol dispenser package, said operating valve having an inlet opening for communication with the product reservoir of said package, and an outlet opening serially communicable with said regulator inlet opening, by way of said ball-housing valve when present.

7. A regulator according to claim 1 connected in an aerosol dispenser package to regulate the product output therefrom.

8. A regulator according to claim 1 comprising a probe operable by said piston, when moved with said diaphragm by action of said spring alone, to close said outlet opening.

9. A regulator according to claim 8 wherein said probe is mounted for operation by engagement of said piston therewith, such mounting being resiliently biassed otherwise to open said outlet opening.

10. A regulator according to claim 1, wherein said restricted passageway is defined between respective mutually-facing annular surfaces of said one compartment and piston, such surfaces each being similarly inclined relative to the direction of said diaphragm movment to separate in progressively increasing manner with movement towards said outlet opening.

11. A regulator according to claim 10 wherein said annular surfaces are mutually inclined to extend divergently towards said outlet opening.

12. A regulator according to claim 11 wherein said annular surfaces are mutually inclined at an angle in the range 3°–5°.

13. A regulator according to claim 1 wherein said outlet opening is, or communicates with, the orifice of an aerosol dispenser spray nozzle.

14. A regulator as claimed in claim 13 comprising a nozzle engaged in push-fit manner with said plug at its end nearer said socket open end, said nozzle having an orifice therethrough communicated with said outlet opening.

15. A regulator according to claim 14, wherein said housing is an actuator button for an aerosol dispenser package.

* * * * *